United States Patent [19]
Griffin

[11] Patent Number: 4,858,725
[45] Date of Patent: Aug. 22, 1989

[54] LADDER BRACE

[76] Inventor: Lamar H. Griffin, Lineal Enterprises, Inc., 3737 Northview Ln., Dallas, Tex. 75229

[21] Appl. No.: 255,345

[22] Filed: Oct. 11, 1988

[51] Int. Cl.$^4$ .............................. E06C 5/24; E06C 5/04
[52] U.S. Cl. ........................................ 182/127; 182/68
[58] Field of Search ....................... 182/127, 97, 98, 68

[56] References Cited

U.S. PATENT DOCUMENTS

| | | | |
|---|---|---|---|
| 2,499,091 | 2/1950 | Brubaker | 182/127 |
| 2,586,531 | 2/1952 | Gordon | 182/127 |
| 2,946,397 | 7/1960 | Berberich | 182/127 |
| 3,043,398 | 7/1962 | Bakula | 182/127 |
| 3,123,178 | 3/1964 | Monaghan | 182/127 |
| 3,621,935 | 11/1971 | Bode | 182/127 |
| 4,174,021 | 11/1979 | Barlock | 182/127 |
| 4,408,680 | 10/1983 | Ross | 182/127 |
| 4,580,660 | 4/1986 | Oling | 182/214 |
| 4,652,003 | 3/1987 | Karashima | 182/127 |

Primary Examiner—Reinaldo P. Machado

[57] ABSTRACT

A ladder brace designed for transporting, for deploying and supporting a standard, mobile extension ladder and intended to be pivotally attached to the lower, rear portion of a vehicle. The ladder brace consists of two T-shaped support members comprising a first main brace and a second main brace. In its transport position, the ladder brace is positioned with each first brace extending vertically upwardly and with each second brace extending horizontally. The ladder brace is designed such that a standard extension ladder, such as an aluminum ladder having open ended hollow rungs may be positioned in parallel relationship with and between both of the second braces and pivotally supported between both of the second braces. The ladder brace is further designed to allow deployment from the transport position by pulling downwardly on the ladder brace to pivot the second braces, as well as the ladder, from a horizontal position to a substantially vertical position with a portion of each of the T-shaped support members abutting the ground. The ladder brace further comprises a safety stop device pivotally joined with the ladder brace, for initially securing the mobile extension ladder against pivotal movement after deployment of the ladder brace and during final deployment of the mobile extension ladder.

7 Claims, 1 Drawing Sheet

LADDER BRACE

FIELD OF THE INVENTION

This invention relates to support braces used in conjunction with mobile extension ladders, and, specifically, this invention relates to a deployable ladder brace which accommodates a standard, mobile extension ladder and which is capable of being mounted upon a raised mobile platform or upon the rear portion of a motorized vehicle, such as a van. The ladder brace is intended to be mounted so as to pivot from a transport position to a deployed position.

BACKGROUND OF THE INVENTION

Extension ladders have been utilized for decades in industries such as advertising, repair and construction, to allow workers access to certain work areas located at various heights. The traditional method used to deploy an extension ladder entails manually removing the extension ladder from a vehicle, carrying the ladder to the site at which the work is to be performed, and manually positioning the ladder against a portion of the structure followed by raising the ladder to the appropriate height. In fact, this procedure is still practiced when a service vehicle is not easily driven to the specific job site. Over time, however, as more service vehicles have been placed in use and more service calls have been required to be undertaken by each work crew, the need has arisen for provision of a ladder assembly comprising a brace which allows easy and rapid positioning of the mobile ladder without undue manipulation of the ladder by the work crew, and without the requirement of two or more workers to deploy the extension ladder. One such ladder assembly is disclosed in U.S. Pat. No. 3,043,398, issued July 10, 1962, to Bakula.

Bakula discloses a mobile extension ladder adapted to be mounted on a vehicle or similar mobile platform which ladder readily can be shifted from a transport position to an operative position, which is partially self-erecting, and which, when deployed, is supported entirely by the vehicle such that the ladder extends upwardly and forwardly so as to be positioned over a rear portion of the vehicle. This ladder assembly, however, is deficient since the extension ladder can be deployed only in one position in which it is extended upwardly, forwardly and over a portion of the vehicle.

SUMMARY OF THE INVENTION

The ladder brace of the present invention relates to an extension ladder transport and deployment means comprising a rigid support structure pivotally secured to the lower, rear portion or bumper portion of a vehicle, such as a van. This ladder brace allows deployment of the ladder in a number of positions including a position in which the ladder extends upwardly, rearwardly and away from the rear of the vehicle.

Specifically, the ladder brace of the present invention comprises two T-shaped structural members arranged in parallel relationship with at least two cross members positioned between the two structural members so as to join one of the T-shaped structural members with the other of the T-shaped structural members. Each of the T-shaped structural members comprises a first brace, a second brace positioned in perpendicular relationship with the first brace, and a support brace positioned in angular relationship with both the first and the second brace. The first brace is adapted at its proximal end for pivotal attachment to the lower, rear portion or bumper area of a vehicle, such as a van, and, at its distal end, is fixedly secured in substantially perpendicular relationship to an intermediate portion of the second brace. The second brace extends outwardly in opposite directions from the point at which the first brace and the second brace are joined. The second brace is adapted at one of its ends for pivotal attachment to a standard extension ladder, and is fixedly attached at the other of its ends to one end of a support brace. The support brace, in turn, is fixedly attached at the other of its ends to an intermediate portion of the first brace. At this point of attachment, a first cross member is fixedly secured and extends outwardly, for example, in perpendicular relationship, from the junction of the support brace and the first brace. A second cross member is fixedly secured and extends outwardly, for example, in perpendicular relationship, from the junction of the support brace and the second brace. The cross members join one T-shaped structural member with the other T-shaped structural member such that each of the T-shaped structural members define a plane which two planes are parallel one with the other. Each support brace adds structural integrity to the ladder brace. Positioned between the two support braces is a safety stop device pivotally attached thereto. The safety stop device secures the lower portion of the ladder when the brace is in its deployed position.

In its transport position, the ladder brace is pivotally attached to the lower, rear portion of a van with each first brace extending vertically upwardly and with each second brace extending horizontally along the length of the body or chassis of the vehicle. A standard extension ladder, such as an aluminum ladder having open ended, hollow rungs, is positioned in parallel relationship with and between both of the second braces and is pivotally supported between both of the second braces. The ladder may be further supported at its upper or forward end by a separate rack system mounted upon the top, forward portion of the van. The lower or rear end portion of the ladder is positioned freely between the parallel second braces. Fasteners are utilized to further secure the telescoping sections of the extension ladder both to themselves and to the rack system or van body.

From the transport position, the extension ladder is deployed by pulling downwardly on the ladder brace to pivot the second brace as well as the ladder from a horizontal position to a substantially vertical position with the second cross member abutting the ground. The ladder is then positioned adjacent but not necessarily against a stationary structure with the safety stop device abutting a lower portion of the ladder to secure the ladder in position. Thereafter, additional sections of the ladder may be raised such that the distal end of the ladder is properly positioned, and the safety stop device is disengaged and pivoted out of engagement so as to allow the ladder to rest against the stationary structure in its deployed position. Alternatively, when the ladder is deployed with its distal end resting against a stationary structure, the safety stop device is not needed. With this alternative deployment, the distal end of the ladder rests against a structure, the ladder is secured to the ladder brace by a pivot means, and the ladder brace, in turn, is secured to the van, which acts as a weight to secure the ladder against slippage along the surface of the structure. The safety device may be utilized with this alternative deployment when necessary.

The primary object of this invention is to provide a means for deploying a mobile extension ladder which means can be easily shifted from a transport position to a deployed position.

Another object of this invention is to provide a brace which is pivotally connected to a vehicle, which is both supported by the vehicle and which includes a selected portion which rests against the ground, and which further utilizes the weight of the vehicle to stabilize the brace and, thus, the ladder when the ladder is in its extended position.

Another object of the invention is to provide a ladder brace which is operatively connected with the rear portion of a vehicle, and which may be deployed such that the distal, extended end of the ladder may be positioned in many positions including a position in which the ladder extends upwardly, rearwardly and away from the rear of the vehicle.

These general objects as well as the specific objectives of the invention will be understood by reference to the description taken in conjunction with the attached drawings.

DETAILED DESCRIPTION OF THE INVENTION

Figure 2:
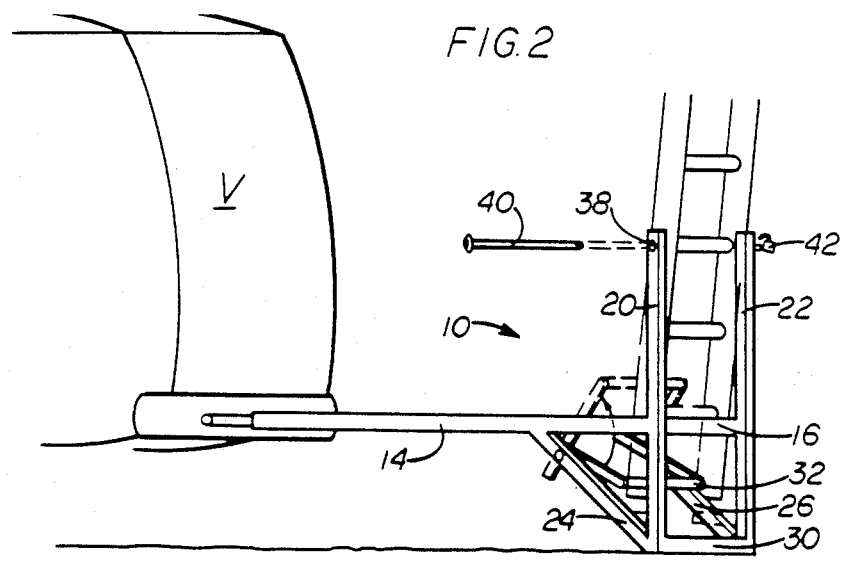
FIG. 2 is a perspective view of the ladder brace of the present invention in its deployed position; the vehicle and the ladder are shown in phantom line representation.
Figure 1:
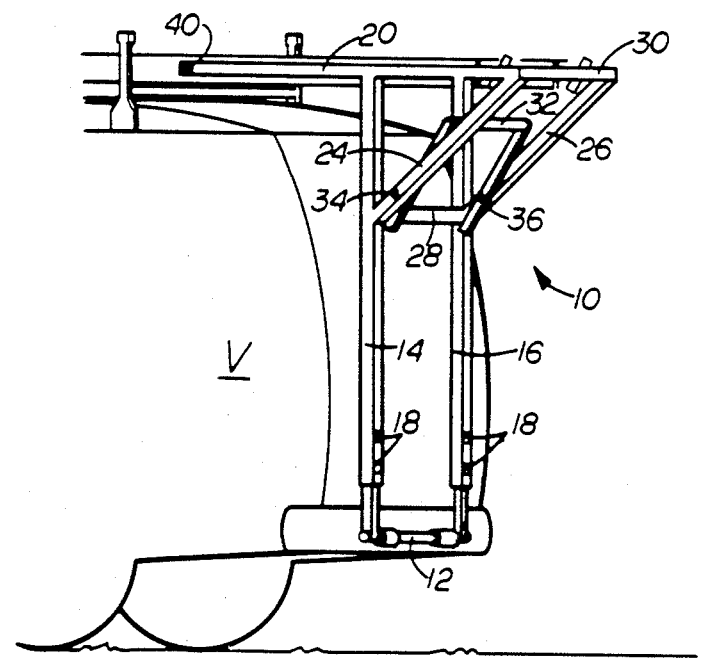
FIG. 1 is a perspective view of the ladder brace of the present invention in its transport position; the vehicle and the ladder are shown in phantom line representation.

The ladder brace of the present invention, designated 10 in FIGS. 1 and 2, is intended to be pivotally attached to the lower rear portion of a vehicle. A pivot means 12 such as a hinge, is attached to a rear portion of a vehicle and is joined to first braces 14 and 16 which braces are positioned in parallel relationship. First braces 14 and 16 are constructed of adjustable, telescoping members, which members bear a series of holes which may be aligned and a locking means, such as a bolted fastener 18, inserted into the aligned holes to lock the telescoping members at a height which allows the ladder to be transported in a horizontal position over the top of the van. First braces 14 and 16 are joined perpendicularly to second braces 20 and 22, respectively. A pair of support braces 24 and 26 connect first braces 14 and 16 with second braces 20 and 22, respectively, as shown in FIGS. 1 and 2. Each support brace 24 and 26 is attached at one of its ends to an end of one of second braces 20 and 22, and at the other of its ends to an intermediate portion of first braces 14 and 16. A cross member 28 is attached at the junction of first brace 14 and support brace 24. Likewise, cross member 28 is attached at the junction of first brace 16 and support brace 26 at their junction. Further, cross member 30 is attached at the junction of second brace 20 and support brace 24. Likewise, cross member 30 is attached at the junction of second brace 22 and support brace 26. Both cross member 28 and cross member 30 add structural integrity to the ladder brace. Positioned between support brace 24 and support brace 26 is a generally U-shaped safety stop device 32 which is pivotally attached at points 34 and 36 to support braces 24 and 26, respectively, so as to swing freely through an arcuate path defined at least by the position of support braces 24 and 26 and a portion of each of first braces 14 and 16.

When the ladder brace is used, an extension ladder having hollow, open-ended rungs is positioned between second brace 20 and second brace 22 with a selected one of the rungs positioned to receive a pivot means, such as a rod or pivot pin, 40. For example, the chosen rung is aligned with an aperture 38 carried on second brace 20 and with another aperture (not shown) carried on second brace 22. Then the shank of a pivot pin bearing a head portion is inserted through one of the apertures, through the hollow rung, through the other of the apertures, and secured by a fastener, for example, placed in a transverse bore carried in said shank at an end opposite said head portion. One such fastener is a cotter pin. Another such fastener is a padlock 42 which padlock functions as a simple, effective and inexpensive fastener as well as a theft prevention device.

The mobile ladder brace of this invention allows for easy transportation of an extension ladder and provides for easy shifting of the extension ladder from the transport position to the deployed position. With these objectives in mind, I have described my invention as set forth in the aforementioned features of form, construction, arrangement and combination of parts.

I claim:

1. A ladder brace for transporting, for deploying and for supporting a standard, mobile extension ladder which ladder brace is pivotally attachable to the lower, rear portion of a vehicle, said ladder brace comprising:

two substantially T-shaped mobile extension ladder supporting members comprising a first main brace and a second main brace, each one of said T-shaped members bearing a secondary supporting brace fixedly secured thereto and positioned at an oblique angle both to said first main brace and to said second main brace wherein each combination of one of said T-shaped members and one of said secondary supporting braces defines substantially a geometric plane, said T-shaped structural members being fixedly joined one to the other by at least two cross members, with two of said cross members positioning said two T-shaped supporting members substantially in parallel planar relationship;

a first pivot means joined between each of said first main braces, for attaching said braces to said lower, rear portion of said vehicle;

a second pivot means joined between each of said second main braces, for pivotally securing said mobile extension ladder to said ladder brace; and a safety stop means pivotally joined between each of said obliquely positioned secondary support braces, for initially securing said mobile extension ladder against pivotal movement about said second pivot means after deployment of said ladder brace and during final deployment of said mobile extension ladder.

2. The ladder brace of claim 1 wherein said first pivot means comprises at least one hinge pin cooperating with a hinge means.

3. The ladder brace of claim 1 wherein each of said first main braces comprises a length adjustment means.

4. The ladder brace o claim 3 wherein said length adjustment means comprises at least two telescoping members each of said telescoping members bearing a series of holes positioned such that certain of said holes carried by a first of said telescoping members may be aligned with certain of said holes carried by a second of said telescoping members, and further comprises at least one fastening device for fastening said first telescoping member to said second telescoping member by insertion into and securement within certain of said aligned holes of said first telescoping member and said second telescoping member.

5. The ladder brace of claim 1 wherein said second pivot means comprises an elongate rod having a first securement means at a first end of said rod and a second securement means at a second end of said rod, and further comprising a receiving aperature carried on each of said second main braces for receiving a portion of said elongate rod body.

6. The ladder brace of claim 5 wherein said first securement means comprises a distended head portion at a first end of said rod and said second securement means comprises both a transversely positioned bore at a second end of said rod and a locking means for insertion into and for securement within said bore.

7. The ladder brace of claim 1 wherein said safety stop means comprises a generally U-shaped member including a ladder engagement portion.

* * * * *